No. 700,547. Patented May 20, 1902.
J. NEILSON.
RANGE FINDER.
(Application filed Jan. 24, 1902.)
(No Model.) 2 Sheets—Sheet 2.
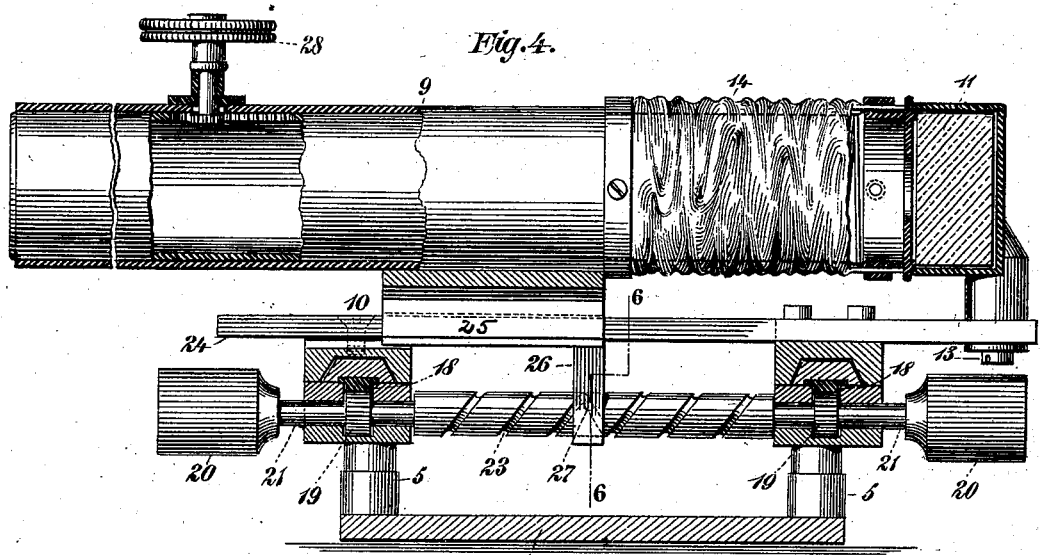
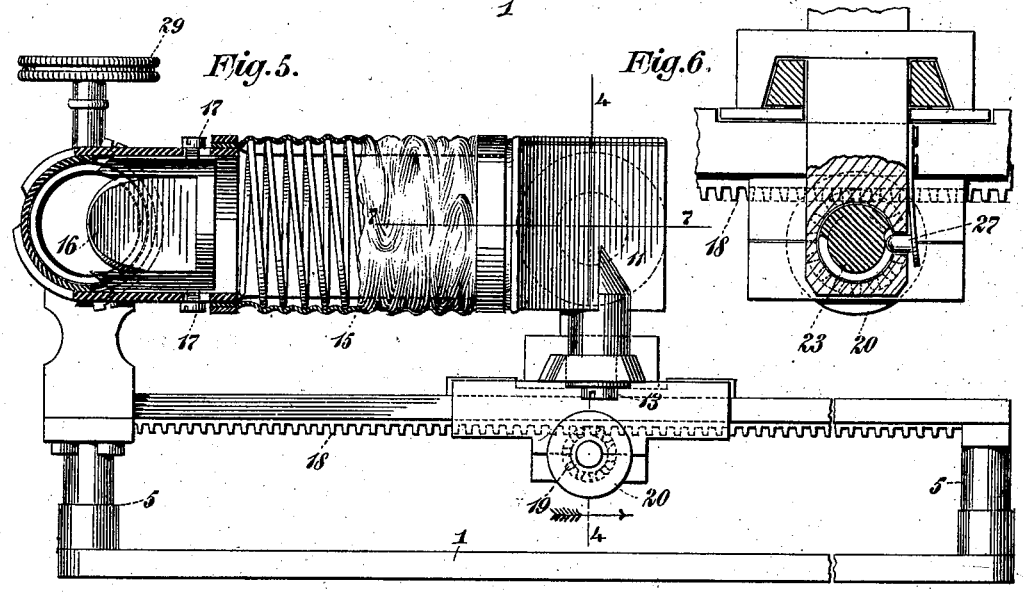
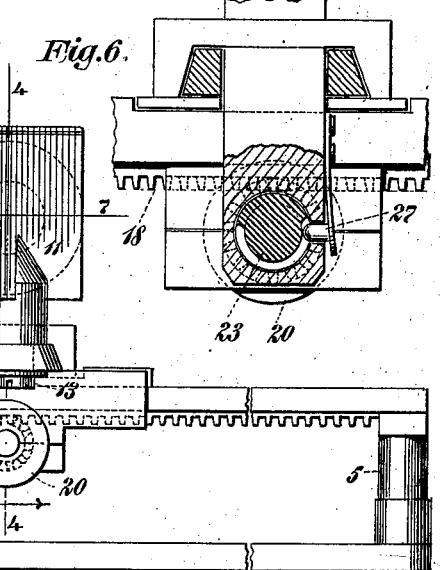
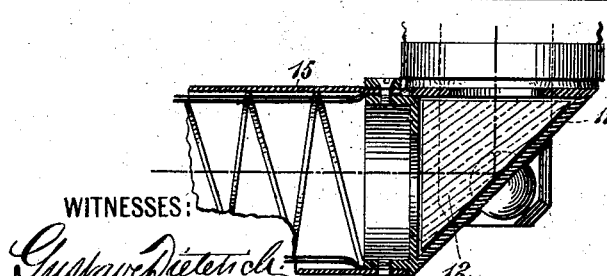
WITNESSES: INVENTOR
John Neilson
BY
ATTORNEYS

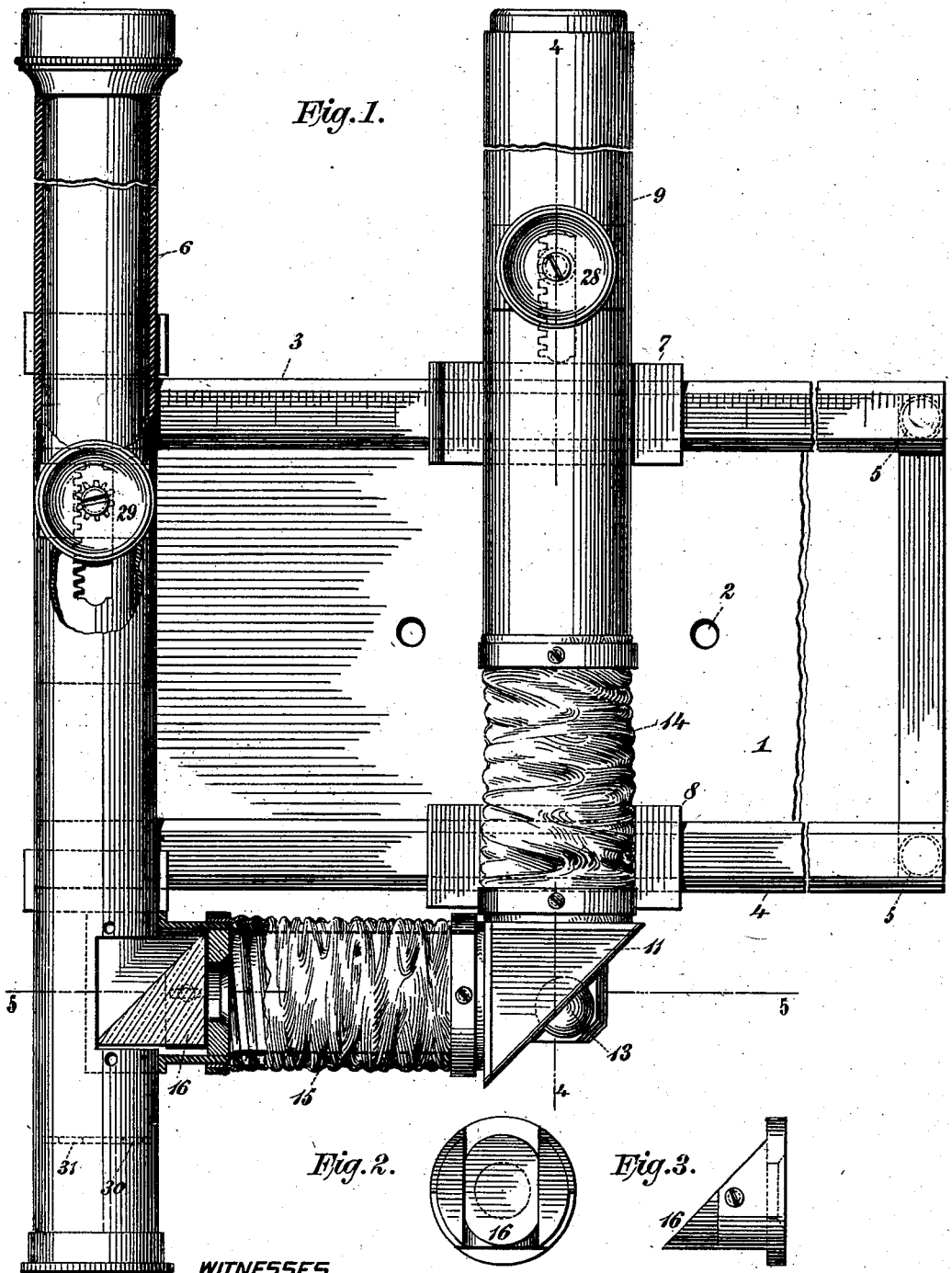

UNITED STATES PATENT OFFICE.

JOHN NEILSON, OF LARCHMONT, NEW YORK.

RANGE-FINDER.

SPECIFICATION forming part of Letters Patent No. 700,547, dated May 20, 1902.

Application filed January 24, 1902. Serial No. 91,034. (No model.)

*To all whom it may concern:*

Be it known that I, JOHN NEILSON, a citizen of the United States of America, residing at Larchmont, county of Westchester, and State of New York, have invented certain new and useful Improvements in Range-Finders, of which the following is a specification, reference being had therein to the accompanying drawings.

My invention relates to range-finders; and its objects are to provide an instrument for measuring distances more accurately and more conveniently than has heretofore been accomplished.

To these ends my invention consists, mainly, of two telescopes mounted, one fixed and one movable, at a determinate angle with each other and means of refracting or reflecting the rays of light passing through the movable telescope into coincidence with the direct rays of light passing through the fixed telescope and also of certain details of construction.

I proceed to describe an instrument embodying my invention and then point out the novel features in the claims, reference being had to the accompanying drawings, forming part of this specification, in which like parts are designated by like figures throughout the various views, of which—

Figure 1 is a top plan view. Figs. 2 and 3 are detailed views of one of the prisms; Fig. 4, a section on line 4 4 of Fig. 1; Fig. 5, a section on line 5 5 of Fig. 1; Fig. 6, a section on line 6 6 of Fig. 4; Fig. 7, a section on line 7 7 of Fig. 5. Fig. 8 is a detail view showing diaphragm and cross-hairs in telescope 6.

1 is a base or platform adapted to be fixed to a tripod by means of screws through holes 2 or to be provided with a handle or any other convenient device for supporting the instrument.

Upon the base 1 are supported two rails 3 and 4 by posts 5. At right angles to said rails 3 and 4 and rigidly attached thereto is a telescope 6.

7 and 8 are slides arranged to slide upon rails 3 and 4, respectively. Upon slides 7 and 8 and rigidly connecting them is a cross-rail 24. Slide 25, bearing a telescope 9, is adapted to ride upon cross-rail 24, so that telescope 9 may be moved both lengthwise and crosswise of rails 3 and 4. Cross-rail 24 is attached to slide 7 by set-screw 10, so that the angle between the lines of collimation of the two telescopes may be adjusted.

11 is a box containing a prism 12. Said box is attached to slide 8 by set-screw 13 and so arrranged that its prism 12 will receive the rays of light from telescope 9 and refract them.

14 and 15 are extensible tubes, 14 connecting telescope 9 with prism 12, and 15 connecting prism 12 with a prism 16. Prism 16 (shown in detail in Figs. 4 and 5) is also contained in a box which is attached to telescope 6. By set-screws 17 it may be adjusted so as to refract rays of light received from prism 12 to eyepiece of telescope 6.

Of course it will be readily understood that instead of prisms 12 and 16, reflecting-surfaces, such as mirrors, may be used and that the prism 16 or mirror should occupy only one-half of the field of telescope 6.

Said rails 3 and 4 each are provided with a rack 18, and within the slides 7 and 8 is journaled a rod 21, bearing two pinions 19, coöperating with said racks, so that by turning the handles 20 the slides 7 and 8, bearing, respectively, telescope 9 and prism 12, may be moved toward or away from telescope 6.

Attached to slide 25 is lug 26, bearing the spring-controlled pin 27, and upon said rod 21 is worm 23, with which said pin 27 coöperates, so that when said rod 21 is turned the slide 25, and with it telescope 9, will be carried on said rail 24 crosswise of rails 3 and 4.

28 and 29 are thumb-screws connected with pinions and coöperating with ordinary racks, respectively, in telescopes 9 and 6, so as to focus the same.

32 is a diaphragm in telescope 6, having two openings 30 and 31, each provided with a cross-hair and arranged so that the direct rays through telescope 6 may be observed through opening 31 and the refracted rays from telescope 9 may be observed through opening 30.

It will be understood that the prisms 12 and 16, being right-angle prisms, or should reflectors be used having been adjusted the one at right angles to the line of collimation of one telescope and the other at right angles to the line of collimation of the other telescope, and a certain angle having been determined at which telescope 9 is set with reference to telescope 6 by means of set-screw 10, and the rail 3 having been calibrated by well-known rules, the distance of any object in view through telescope 6 can be ascertained as soon as the direct and refracted or reflected rays from the same are brought into coincidence. It will also be understood that as handle 20 is turned and the distance between the telescopes changed the focal distance between the object-glass of telescope 9 and the eyepiece of telescope 6 is simultaneously adjusted by the movement of telescope 9 crosswise of rails 3 and 4.

What I claim, and desire to secure by Letters Patent, is—

1. A range-finder comprising a base, a telescope rigidly attached thereto, a telescope mounted thereon at an angle to said first-mentioned telescope, means of moving the second-mentioned telescope toward and away from the one first mentioned and of simultaneously adjusting the focal distance between the eyepiece of the first-mentioned telescope and the object-glass of the other one as the distance between the two telescopes is changed, means of throwing the rays received through the movable telescope into the fixed telescope and a scale to record the distance between the two telescopes and thereby that of the object viewed.

2. A range-finder comprising a base, a telescope rigidly attached thereto, a telescope mounted thereon at an angle to said first-mentioned telescope, means of adjusting said angle, means of moving the second-mentioned telescope toward and away from the one first mentioned and of simultaneously adjusting the focal distance between the eyepiece of the first-mentioned telescope and the object-glass of the other one as the distance between the two telescopes is changed, adjustable means of throwing the rays received through the movable telescope into the fixed telescope and a scale to record the distance between the two telescopes and thereby that of the object viewed.

3. In a range-finder the combination of a base with a telescope rigidly attached thereto, a telescope mounted thereon at an angle to said first-mentioned telescope, means of moving the second-mentioned telescope toward and away from the one first mentioned and of simultaneously adjusting the focal distance between the eyepiece of the first-mentioned telescope and the object-glass of the other one as the distance between the telescopes is changed, a prism adapted to divert the rays received through the movable telescope toward the fixed telescope, a prism adapted to divert the rays received through the first-mentioned prism to the eyepiece of the rigid telescope, extensible tubes connecting the first-mentioned prism both with the movable telescope and the other prism, and a scale to record the distance between the two telescopes and thereby that of the object viewed.

In testimony whereof I have hereunto set my hand the 23d day of January, 1902.

JOHN NEILSON.

In presence of—
H. V. N. PHILIP,
J. T. BOUDREAU.